(12) United States Patent
Bolzacchini (10) Patent No.: US 7,621,805 B2
(45) Date of Patent: Nov. 24, 2009

(54) MEAT TENDERIZING DEVICE

(75) Inventor: Giovanni Bolzacchini, Solarolo Di Goito (IT)

(73) Assignee: Inox Meccanica S.R.L., Solarolo Di Goito (IT)

( * ) Notice: Subject to any disclaimer, the term of this patent is extended or adjusted under 35 U.S.C. 154(b) by 0 days.

(21) Appl. No.: 12/285,903

(22) Filed: Oct. 16, 2008

(65) Prior Publication Data

US 2009/0111367 A1 Apr. 30, 2009

(30) Foreign Application Priority Data

Oct. 25, 2007 (IT) .......................... MN2007A0040

(51) Int. Cl.
*A22C 9/00* (2006.01)

(52) U.S. Cl. .................................... 452/141

(58) Field of Classification Search .......... 452/141–147
See application file for complete search history.

(56) References Cited

U.S. PATENT DOCUMENTS

| 4,055,872 | A |  | 11/1977 | Wagner |  |
| 5,342,235 | A |  | 8/1994 | Watanabe |  |
| 5,525,102 | A |  | 6/1996 | Jaccard |  |
| 5,638,744 | A |  | 6/1997 | Smith |  |
| 5,785,589 | A | * | 7/1998 | Lagares-Corominas | ..... 452/141 |
| 6,135,873 | A | * | 10/2000 | Jaccard | ........................ 452/141 |
| 7,037,186 | B2 | * | 5/2006 | Lagares Corominas | ..... 452/144 |

FOREIGN PATENT DOCUMENTS

FR 2 326 867 A 5/1977

\* cited by examiner

*Primary Examiner*—Thomas Price
(74) *Attorney, Agent, or Firm*—Modiano & Associati; Albert Josif; Daniel J. O'Byrne (57) ABSTRACT

A meat tenderizing device, comprising: a supporting bed, which comprises a plurality of longitudinal members arranged in the direction of translational motion of pieces of meat, and a plurality of toothed rods, comprised between the longitudinal members so as to form a deck for conveying the pieces of meat; a head arranged above the supporting bed and comprising knives adapted to be inserted between the longitudinal members of the bed and provided with elements for movement, which comprise elements that are adapted to determine selectively a stroke of the knives in which the lower end position is located at at least one height that lies above, and at at least one height that lies below, the bed that supports the pieces of meat.

7 Claims, 7 Drawing Sheets

MEAT TENDERIZING DEVICE

The invention relates to a meat tenderizing device.

BACKGROUND OF THE INVENTION

It is known that currently the cycle for the industrial processing of many kinds of meat, particularly those intended for the production of cooked hams, provides for an operation, known as tenderizing, that consists in providing cuts to interrupt the fibers of the meat in order to avoid shrinkage during cooking, obtaining at the same time the extraction of proteins from the meat thereby facilitating the retention of injected liquids and an increase in the absorption surface.

Currently, the tenderizing operation is performed by means of devices that comprise a plurality of cutting elements, usually knives, which are made to penetrate the meat, and there are two kinds of such devices: a first kind is adapted to work on meats with a rind that must remain undamaged by the cutting operation, and a second kind is instead used in the processing of meat without a rind, which therefore can be crossed fully by the cutting elements.

In addition to this feature, which forces the operators to change device when the type of processed product changes, known devices suffer further drawbacks which include the size of the knives comprised therein.

SUMMARY OF THE INVENTION

The aim of the present invention is to provide a tenderizing device that has great constructive simplicity and allows to work on any kind of meat, with or without a rind.

The proposed aim is achieved by a meat tenderizing device as defined in the appended claims.

BRIEF DESCRIPTION OF THE DRAWINGS

Further characteristics and advantages of the present invention will become better apparent from the description of a preferred but not exclusive embodiment thereof, illustrated by way of non-limiting example in the accompanying drawings, wherein.

DESCRIPTION OF THE PREFERRED EMBODIMENTS

Figure 1:
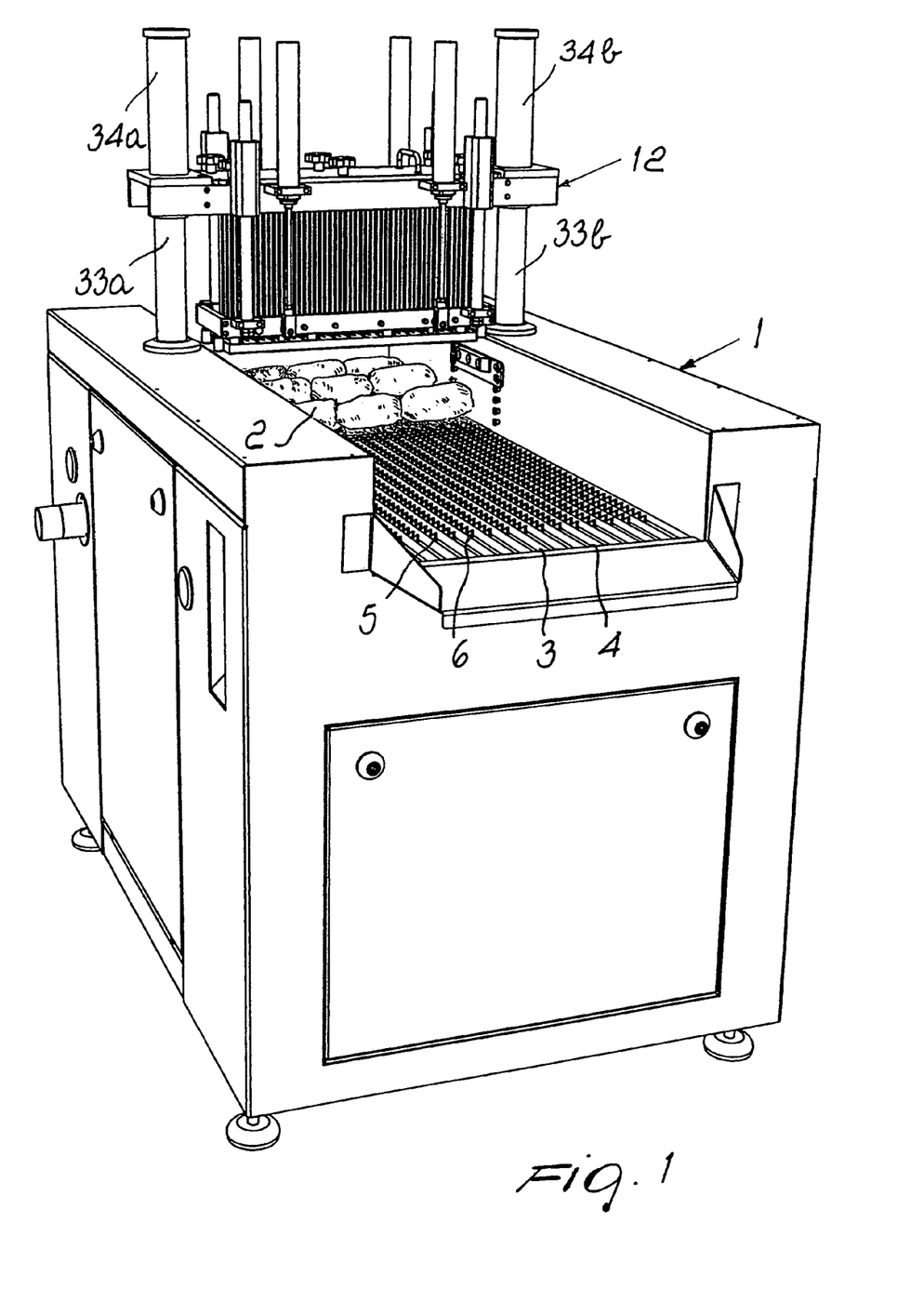
FIG. 1 is a perspective view of the device according to the invention, with the head at the upper stroke limit.

With reference to the figures, the reference numeral 1 generally designates a meat tenderizing device, which comprises a bed for supporting the pieces of meat 2 to be processed, the bed comprising a plurality of parallel longitudinal members 3 and 4, indicated generically in FIG. 1, which are suitably spaced and fixed to the structure of the device in the direction of translational motion of the pieces of meat, the bed further comprising a plurality of toothed rods 5 and 6, indicated generically in FIG. 1, each comprised in the gap between two contiguous longitudinal members and connected one another by means of underlying cross-members, that are not shown in the drawings, so as to form a deck.

Figure 2:
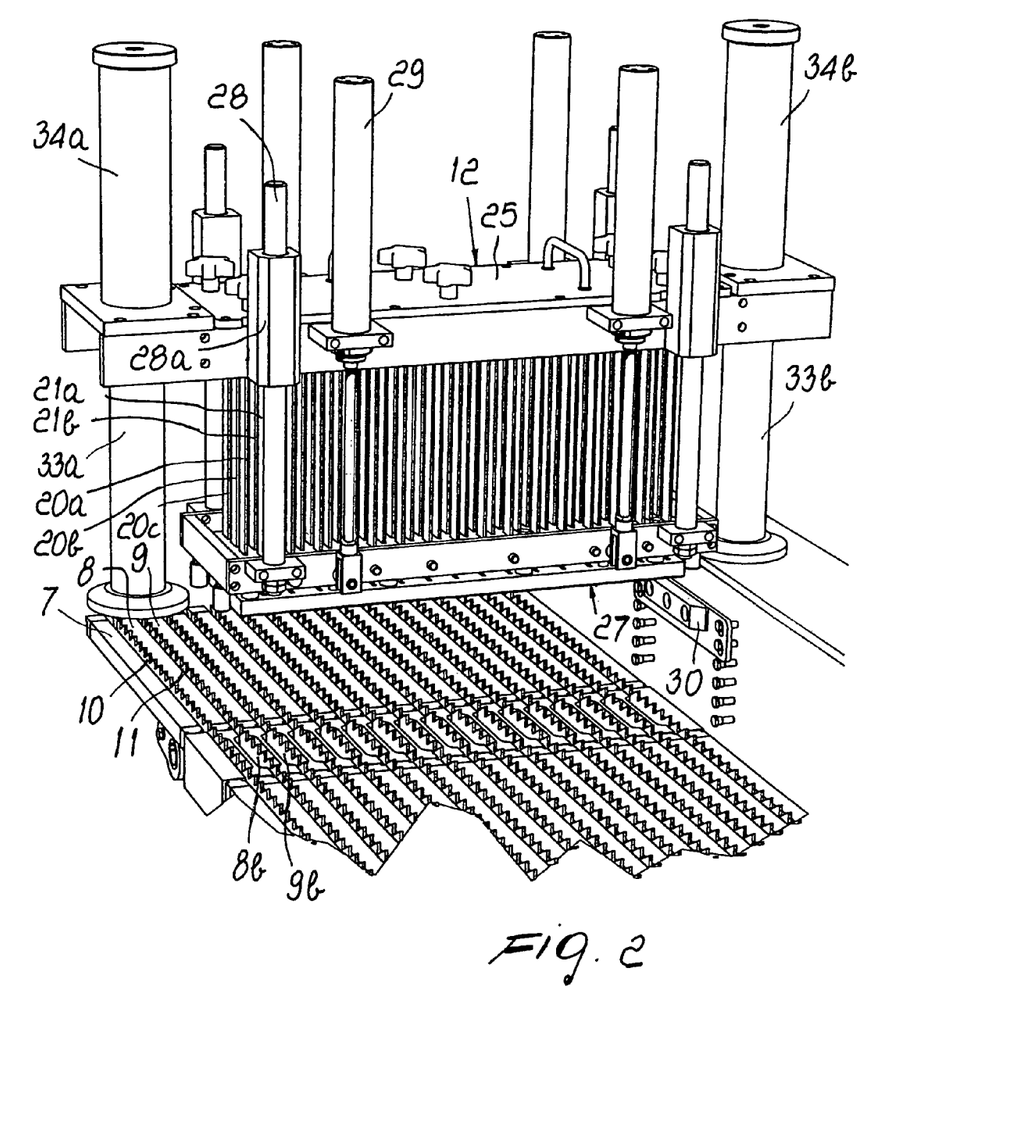
FIG. 2 is a view of a detail of FIG. 1.
Figure 3:
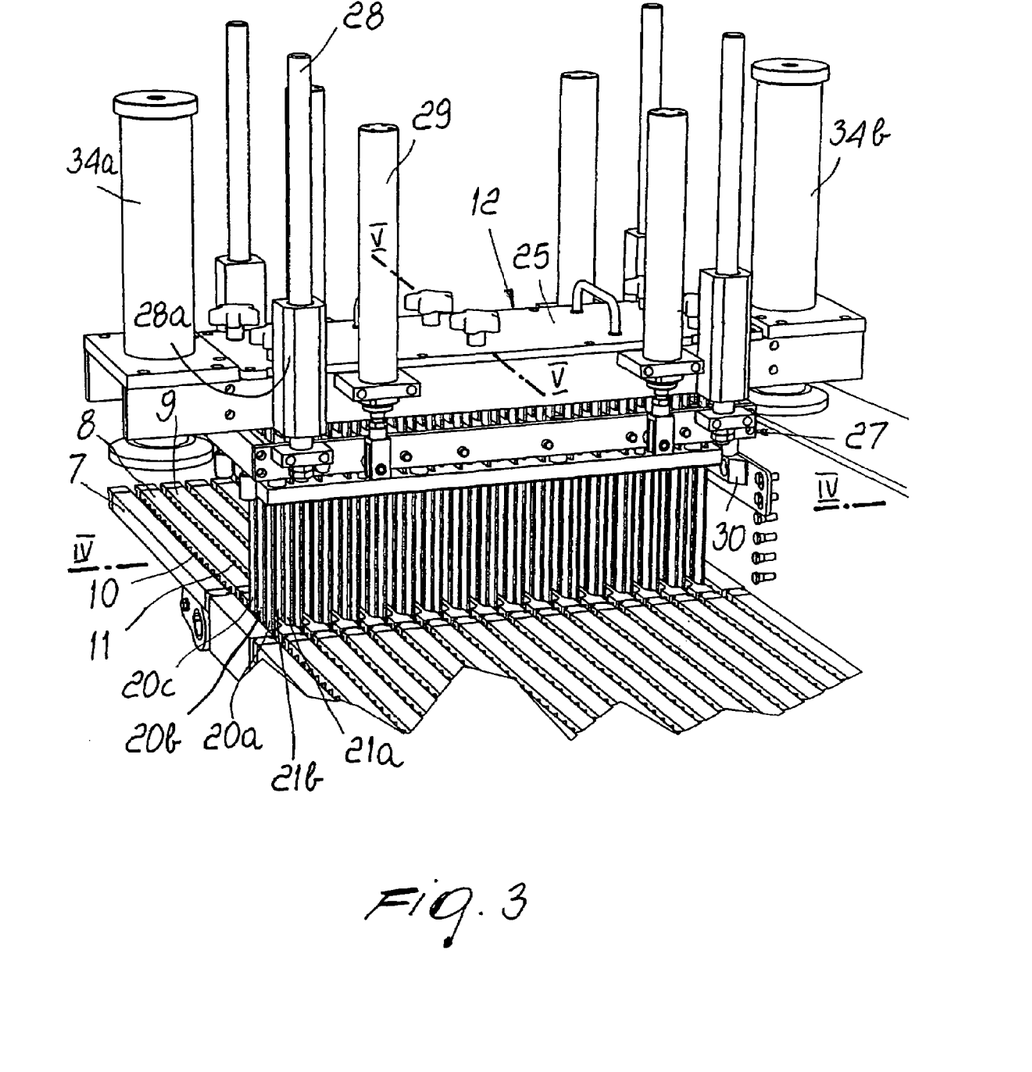
FIG. 3 is a view of the same detail, but with the head at the lower stroke limit.
Figure 4:
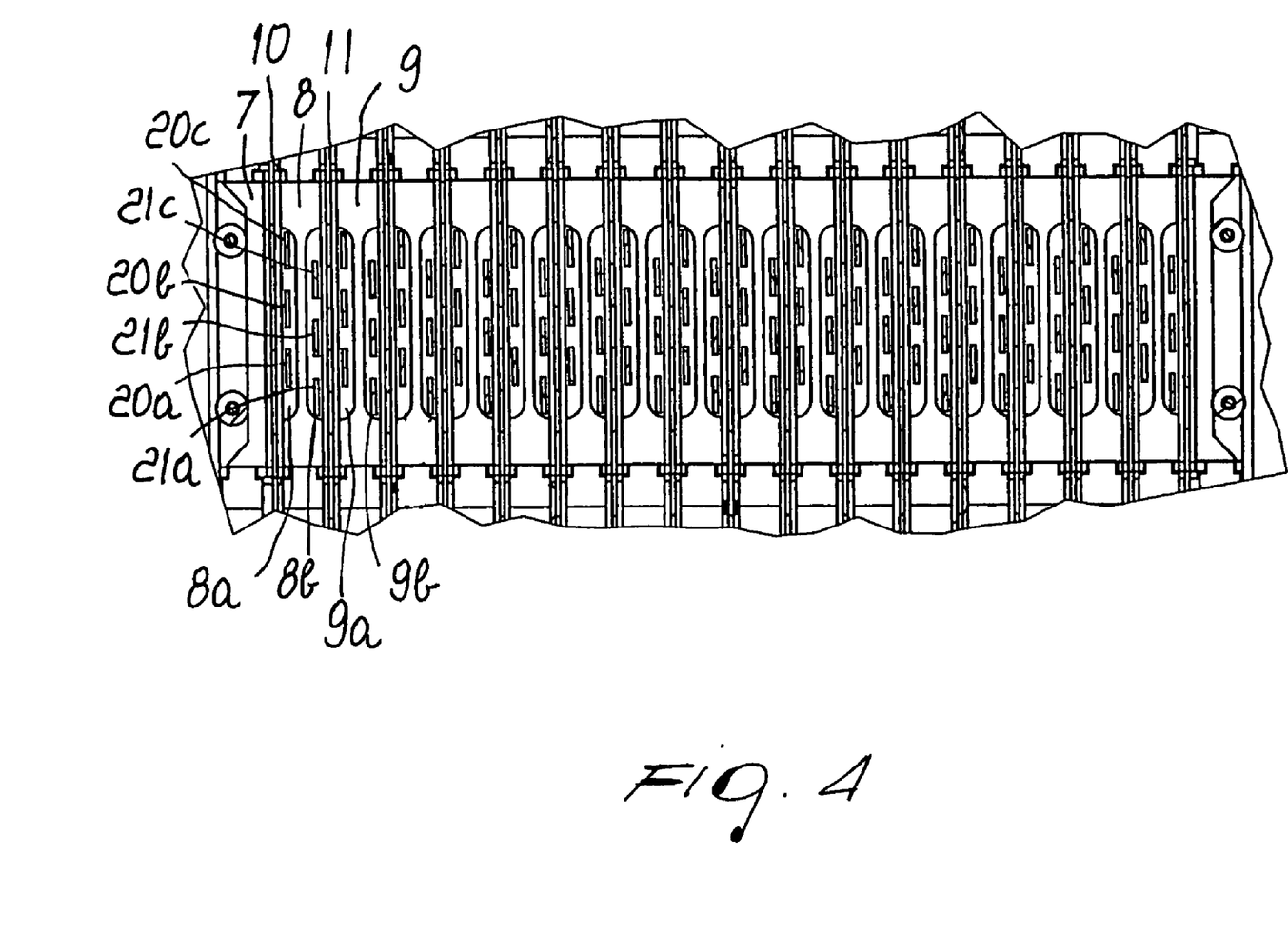
FIGS. 4 and 5 are respectively sectional views taken along the lines IV-IV and V-V of FIG. 3.

More particularly, and with reference to FIGS. 2, 3, 4, the reference numerals 7, 8 and 9 designate the first three longitudinal members provided at one end of the bed, and the reference numerals 10, 11 designate the toothed rods that are accommodated in the intervals respectively between the longitudinal members 7, 8 and between the longitudinal members 8, 9.

It can be noted immediately that all the longitudinal members 8, 9, and therefore with the sole exclusion of the two end longitudinal members 7, have recesses 8a, 8b for the longitudinal member 8 and 9a, 9b for the longitudinal member 9 in the region that lies below a head 12 of the device, as will be described in greater detail hereinafter.

The deck comprises the toothed rods 10, 11 and is provided with movement means, shown in particular in FIG. 7, which comprise first means and second means, which are adapted to provide such deck with a motion that is composed of two motions that are conveniently synchronized, as will be explained in the description of operation, to provide the translational motion of the pieces of meat that rest on the bed.

The first means are adapted to give the deck a reciprocating motion in a direction at right angles to the supporting surface of the pieces of meat, defined by the longitudinal members 7, 8, 9, i.e., in other words, at right angles to the direction of translational motion of the pieces of meat, and such motion occurs between an upper end position, in which the teeth of the toothed rods 10, 11 emerge from the supporting surface, and a lower end position, in which the teeth are in a position that lies below said surface.

The first means comprise two cranks 13a, 13b, which are keyed to a shaft 13c, and two cranks 14a, 14b, which are keyed to a shaft 14c, adapted to provide a resting contact with sliders 13d for the crank 13a and 14d for the crank 14a, provided on the bottom of the deck; the shafts 13c, 14c are motorized by means of transmissions by a rotating cam 15, which receives motion by means of a belt 15a from an electric motor 16.

The second means are adapted to give the deck a reciprocating motion in the direction of translational motion of the pieces of meat, and therefore in the direction of the longitudinal members 7, 8, 9 that form the supporting surface of the pieces, and comprise a crank 17a, which is keyed on a shaft 17b, inserted so that the end is in contact between the two protrusions 18a, 18b that extend from the bottom of the deck; the shaft 17b is motorized by means of transmissions by a rotating cam 19, which receives motion by means of a belt 19a again from the electric motor 16.

The head 12 now described in detail is provided with a plurality of knives arranged in aligned rows and with their blades directed downwardly, adapted to enter spaces comprised between the longitudinal members of the bed, arranging themselves laterally to the toothed rods that are present thereat.

Reference should be made for example to three knives 20a, 20b, 20c of the first row, which are designed to enter the recess 8a of the longitudinal member 8, arranging themselves laterally adjacent to the toothed rod 10, or to three knives 21a, 21b, 21c of the second row, which are designed to enter the recess 8b of the longitudinal member 8, arranging themselves laterally adjacent to the toothed rod 11.

Figure 5:
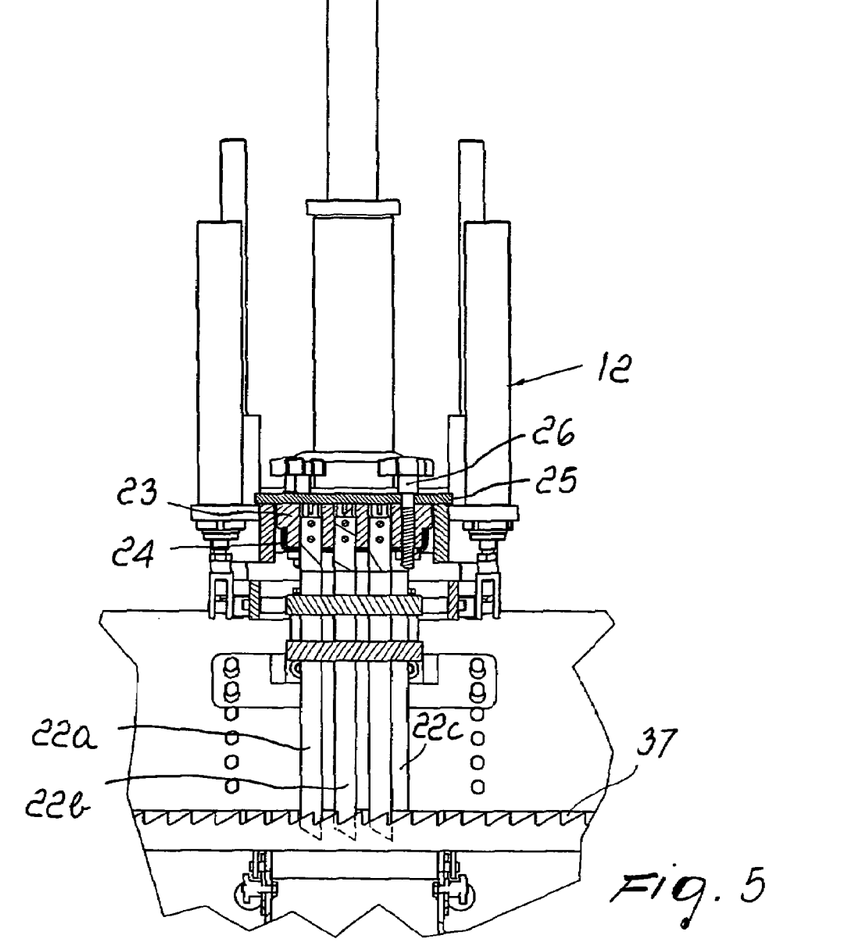

The upper ends of the knives, and reference should be made for example to three knives 22a, 22b, 22c shown in FIG. 5, are accommodated in a containment block 23, which is associated detachably with a tray 24, which is kept in position against a lid 25 and is clamped by threaded stems 26.

The reference numeral 27 further designates a plate that is adapted to guide the knives in their motion for insertion in the meat and to allow their extraction, the plate being associated slidingly with the head 12 by means of four sliders 28, which are inserted in guides 28a and in the presence of four shock absorbers 29; the plate 27 is designed to stop during the descending motion of the head against abutments 30 to a level that lies above the pieces of meat to be processed.

The head 12 is provided with means for movement between the upper end position, visible in FIGS. 1 and 2, in which the blades of the knives are at such a height as to not interfere with the pieces of meat to be processed, and a lower end position, shown in FIGS. 3 and 5, in which the blades are inserted in the meat.

Figure 7:
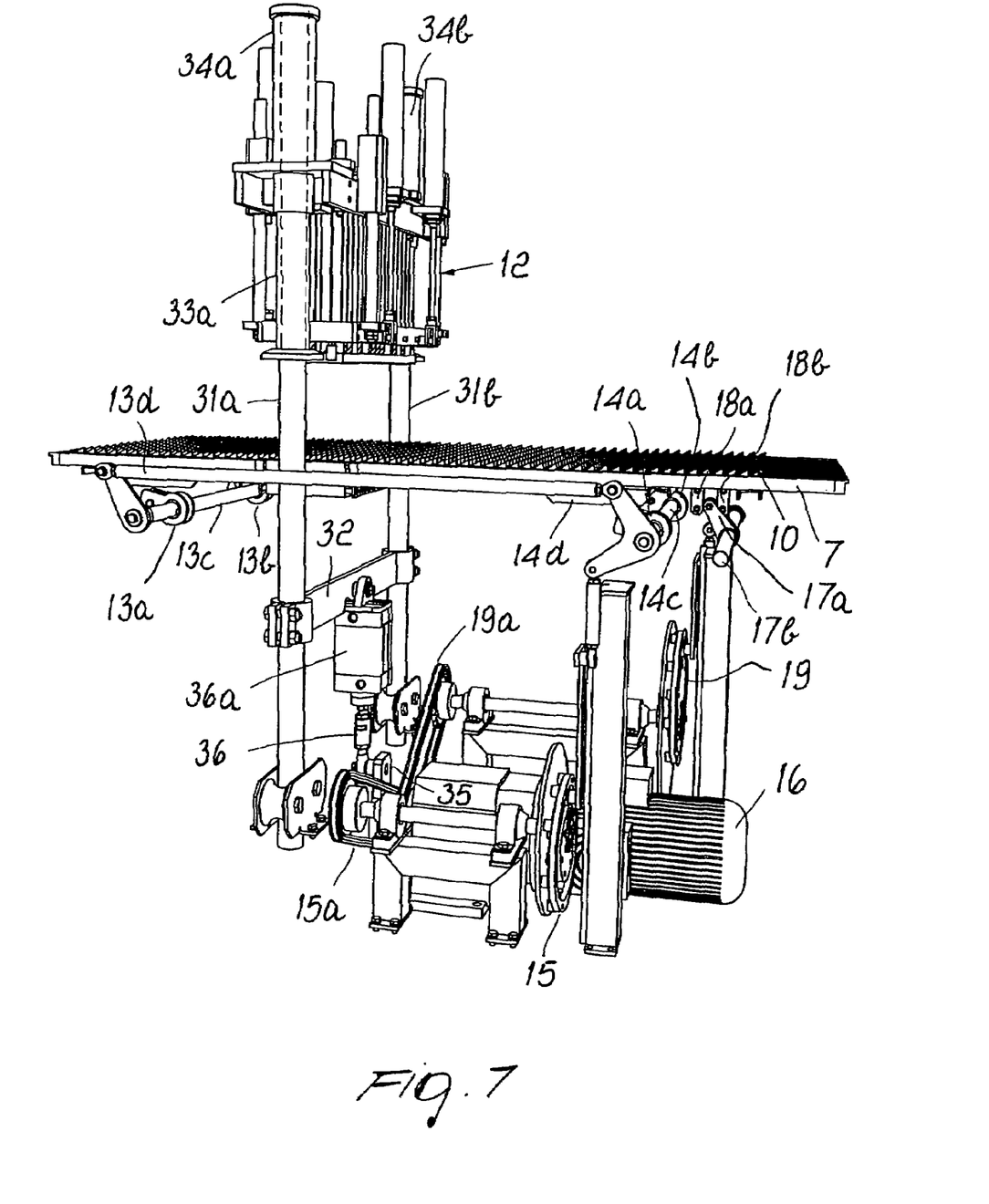
FIG. 7 is a view of the movement elements of the device.

Such movement means, shown with particular reference to FIG. 7, comprise a sliding block formed by pushers 31a, 31b connected by a cross-member 32, which by passing through fixed guides 33a, 33b enter posts 34a, 34b of the structure of the head until they come into contact with the lids provided at the upper end thereof.

The movement of the sliding block comprising the pushers 31a, 31b connected by the cross-member 32 is provided by means of a rod-and-crank device, which is actuated by the electric motor 16: thus, the electric motor turns a crank 35, which is connected to the cross-member 32 by means of a rod 36 provided at the end of a pneumatic cylinder 36a, by virtue of which it is possible to change the length of the rod, and with it the height of the end positions of the stroke of said sliding block and therefore of the stroke of the head 12 with the corresponding knives.

In the situation shown in FIG. 7, the stem of the pneumatic cylinder 36a is fully retracted inside it, and the lower end position of the blades of the knives of the head 12 is the one shown in FIG. 5: the blades are passed below the supporting bed of the pieces of meat formed by longitudinal members 37, thus making it possible to process pieces of meat without rind, which can be crossed completely by the knives.

Figure 6:
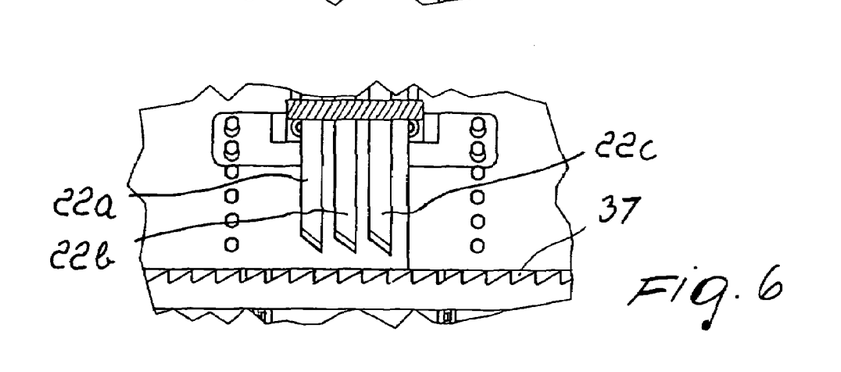
FIG. 6 is again the sectional view taken along the line V-V of FIG. 3, but in a different operating situation.

If instead the pieces of meat to be processed are of the type that comprises a rind resting on the longitudinal members 37, it is sufficient to actuate the protrusion of the stem of the pneumatic cylinder 36a, thus causing the rise of the lower end position of the knives to a height that lies above the longitudinal members 37, so as to provide the situation shown in FIG. 6, which leaves the rind fully intact.

Figure 8:
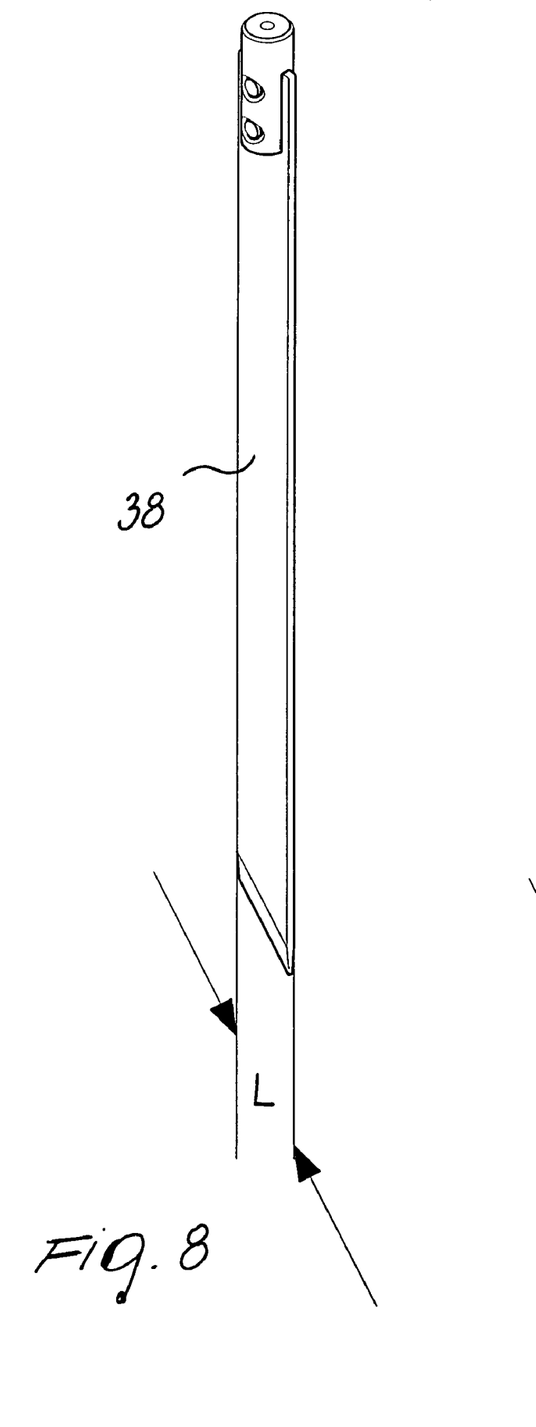
FIGS. 8 and 9 are views of two different embodiments of knives used in the device.
Figure 9:
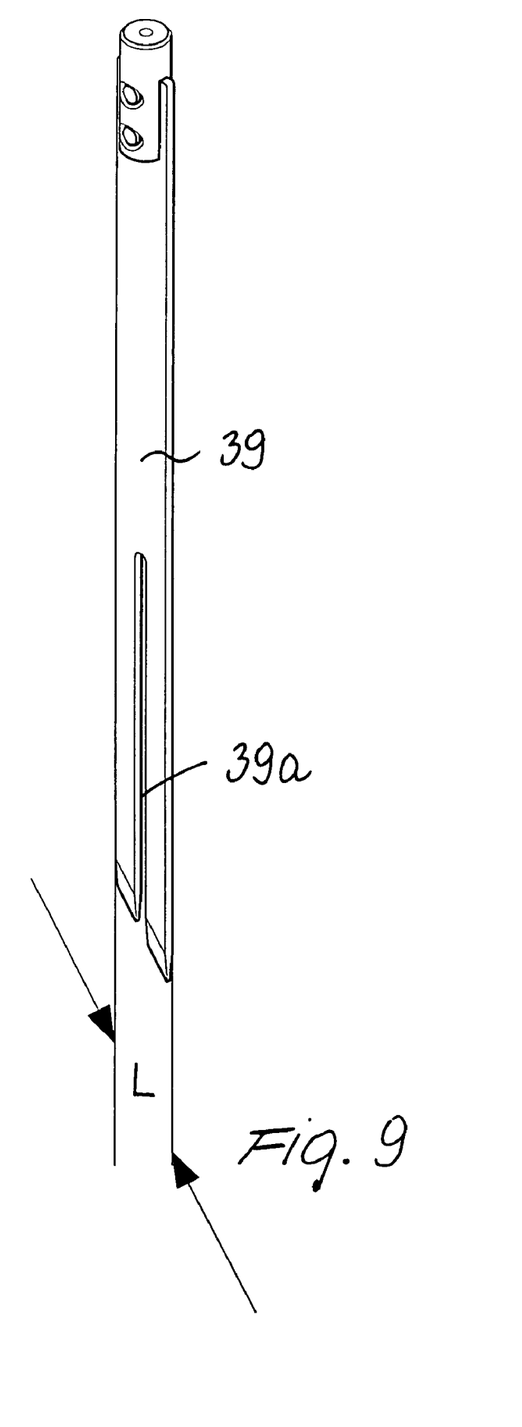

Finally, it should be noted that the knives comprised in the device according to the invention have a considerable width, the height L of the two knives 38 and 39 shown respectively in FIGS. 8 and 9 ranging from 10 to 25 mm, and while the blade of the knife 38 is continuous, the blade of the knife 39 is provided with the intermediate interruption 39a.

Operation of the device according to the invention is now described starting from the situation shown in FIGS. 1 and 2: the head 12 is at the upper stroke limit and the deck that comprises the toothed rods, designed to provide the translational motion of the pieces of meat to be processed that rest on the bed, is at the forward stroke limit of its stroke in the direction of the longitudinal members of the bed, and at the upper stroke limit in the direction that is perpendicular thereto, so that the teeth of the rods protrude from the bed; some pieces of meat 2 are in a position that lies below the head 12.

The head 12 begins to descend, and the deck that comprises the toothed rods descends, moving with the teeth below the bed, and retracts, leaving the meat in place.

At a certain point, the head 12 reaches the lower stroke limit, as shown in FIG. 3, with the knives fully inserted in the meat, and in this situation the deck is at the rear stroke limit and again with the teeth of the rods below the bed.

Now the head 12 rises, and the deck rises also, moving with the teeth of the rods in contact with the meat and moving at the same time toward the forward stroke limit, entraining the pieces of meat with it; the condition that occurred at the beginning of the description is thus restored, but with new meat available to the action of the knives of the head.

The described invention is susceptible of numerous modifications and variations, all of which are within the scope of the appended claims: in particular, the means suitable to change the height of the lower end position of the stroke of the knives of the head may assume any configuration and may be such as to determine the possibility to stop the knives in more than one lower end position, both above and below the supporting bed of the pieces of meat; for example, it is possible to adopt two mutually opposite pneumatic cylinders, optionally provided with different strokes of the corresponding pistons, which by being actuated individually or in combination are capable of determining a plurality of said end positions.

The disclosures in Italian Patent Application No. MN2007A000040 from which this application claims priority are incorporated herein by reference.

What is claimed is:

1. A meat tenderizing device, comprising:
    a supporting bed for pieces of meat to be processed, said supporting bed comprising a plurality of parallel longitudinal members that are suitably spaced and fixed to the structure of the device and arranged in a direction of translational motion of said pieces of meat such as to form a supporting surface of the pieces of meat, and said supporting bed further comprising a plurality of toothed rods, each of which is comprised in a gap between two contiguous longitudinal members, said toothed rods being connected to one another so as to form a deck provided with a first movement means for giving said deck a motion that is composed of two synchronized motions: a reciprocating motion in the direction of translation of the pieces of meat and a reciprocating motion in a direction that is perpendicular to the direction of translation of the pieces of meat between an upper end position in which the teeth of said rods protrude from said supporting surface, and a lower end position, in which said teeth are in a position that lies below said supporting surface;
    a head arranged above the supporting bed of the pieces of meat, said head having a plurality of knives arranged in aligned rows and adapted to enter spaces comprised between the longitudinal members of said supporting bed such that said knives are arranged laterally with respect to the toothed rods that are present thereat, said head being provided with a second movement means for moving said head between an upper end position, in which the blades of the knives are at such a height as to not interfere with the pieces of meat to be processed, and a lower end position, in which said blades are inserted in the meat, said second movement means further comprising means for providing a selected stroke of the knives including selecting the lower end position of the knives in two height locations including at least one first height location that lies above said supporting bed, and at least one second height location that lies below said supporting bed.

2. The device according to claim 1, wherein said second movement means comprise a device that comprises a motorized crank and a rod that is connected to the head in order to give said head the reciprocating translational motion between the upper and lower end positions of the stroke, said rod being provided with an element that is adapted to change a length of said rod so as to change the height of said upper and lower end positions while leaving the stroke unchanged.

3. The device according to claim 2, wherein the rod is provided with an element that is adapted to change a length of said rod and comprises an actuation cylinder connected to one end of the rod.

4. The device according to claim 2, wherein the rod is provided with an element that is adapted to change a length thereof and comprises a pair of mutually opposite actuation cylinders connected to one end of the rod.

5. The device according to claim 1, wherein the knives have a width ranging from 10 to 25 mm.

6. The device according to claim 1, wherein the knives have a continuous blade.

7. The device according to claim 1, wherein the knives have a blade with an intermediate interruption.

* * * * *